(12) United States Patent
Treudt et al.

(10) Patent No.: US 9,970,370 B2
(45) Date of Patent: May 15, 2018

(54) SYSTEM FOR HEATING A STORAGE CONTAINER FOR AN AQUEOUS OPERATING LIQUID IN A MOTOR VEHICLE AND METHOD FOR HEATING THE STORAGE CONTAINER

(71) Applicant: KAUTEX TEXTRON GMBH & CO., KG, Bonn (DE)

(72) Inventors: Volker Treudt, Windeck (DE); Theodor Ossege, Rheinbreitbach (DE)

(73) Assignee: KAUTEX TEXTRON GMBH& CO. KG, Bonn (DE)

( * ) Notice: Subject to any disclaimer, the term of this patent is extended or adjusted under 35 U.S.C. 154(b) by 0 days. days.

(21) Appl. No.: 15/314,500

(22) PCT Filed: Apr. 30, 2015

(86) PCT No.: PCT/EP2015/059518
§ 371 (c)(1),
(2) Date: Nov. 28, 2016

(87) PCT Pub. No.: WO2015/180924
PCT Pub. Date: Dec. 3, 2015

(65) Prior Publication Data
US 2017/0191434 A1 Jul. 6, 2017

(30) Foreign Application Priority Data
May 28, 2014 (DE) .................. 10 2014 007 707

(51) Int. Cl.
*G06F 19/00* (2018.01)
*F02D 41/02* (2006.01)
(Continued)

(52) U.S. Cl.
CPC ....... *F02D 41/0255* (2013.01); *F01N 3/2066* (2013.01); *F01N 3/2896* (2013.01);
(Continued)

(58) Field of Classification Search
CPC ........ F02D 2041/1418; F02D 2041/227; F01P 1/02; F01P 11/00; F01P 7/167; F01N 3/10; B60H 1/00007; B60H 1/00035
(Continued)

(56) References Cited

U.S. PATENT DOCUMENTS 6,920,845 B2   7/2005  Lelkes et al.
8,341,951 B2   1/2013  Prior et al.
(Continued)

FOREIGN PATENT DOCUMENTS

CN    102052128       5/2011
DE    2347038 A1      3/1975
(Continued)

OTHER PUBLICATIONS

PCT International Search Report dated Jul. 27, 2015, received in corresponding PCT Application No. PCT/EP15/59518, 4 pgs.
(Continued)

*Primary Examiner* — John Kwon
(74) *Attorney, Agent, or Firm* — Grossman, Tucker, Perreault & Pfleger, PLLC

(57) ABSTRACT

The invention relates to a system for heating a storage container (1) for an aqueous operating liquid in a motor vehicle having a combustion engine cooled by means of a liquid heat transfer medium, using the waste heat from the combustion engine, which is transferred to the heat transfer medium. The system comprises a first heat exchanger (9), which is provided in or on the storage container (1) and can be heated by means of the heat transfer medium in a cooling circuit (3) for the combustion engine, wherein the first heat exchanger (9) is part of a storage container heating circuit (10), which comprises a heat transfer medium feed (11) and a heat transfer medium return (12), wherein the storage container heating circuit (10) is connected hydraulically in (Continued)

Figure 1:
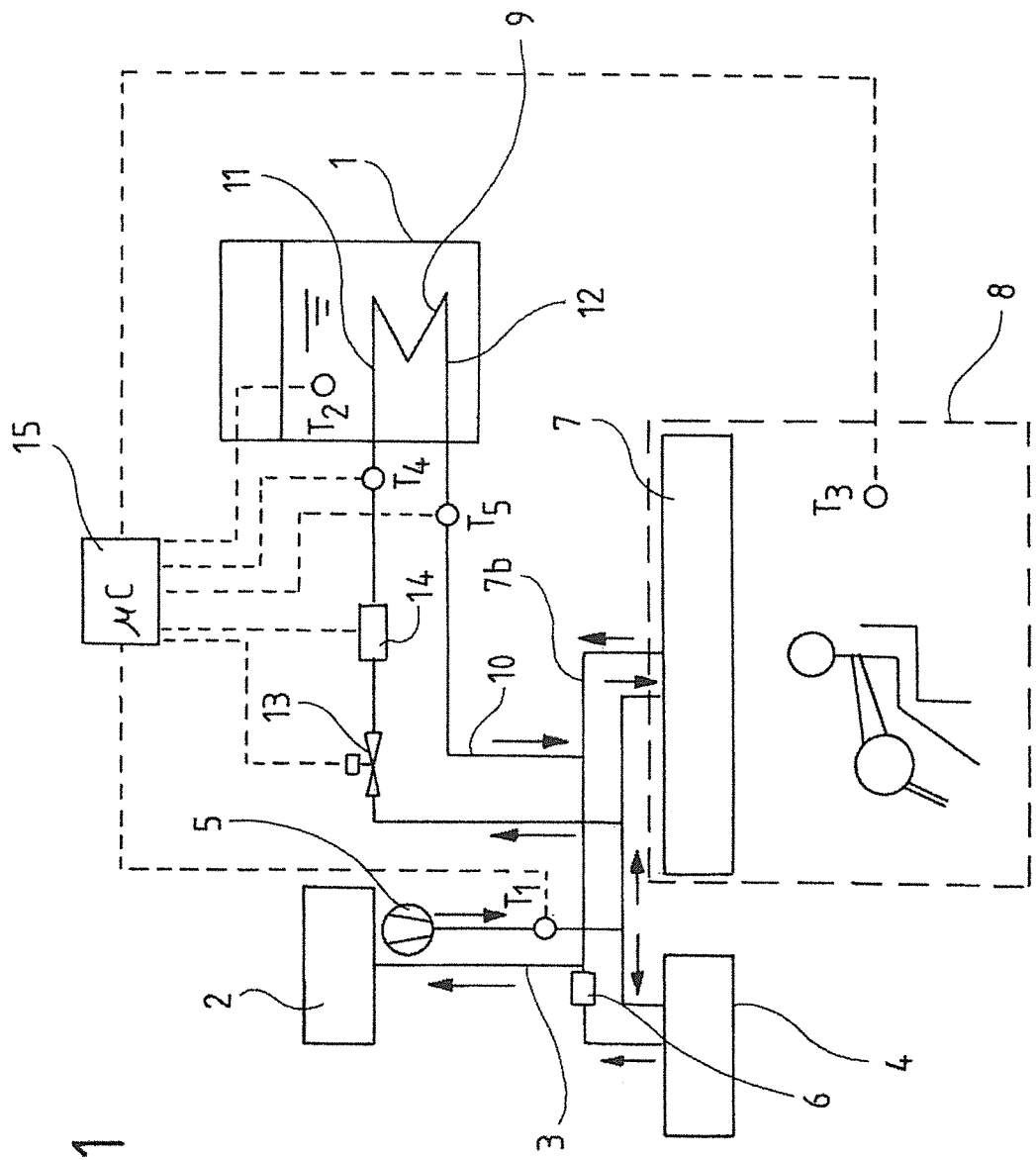

parallel with a second heating circuit (7b) with a second heat exchanger (7) for heating the passenger cell (8) of the motor vehicle. The storage container heating circuit (10) comprises a valve with a controllable volume flow and further comprises means for measuring the M volume flow of heat transfer medium in the storage container heating circuit (10) and means for controlling the valve (13) in accordance with one or more temperature signals from various temperature sensors (T1 to T5). The invention furthermore relates to a method for heating a storage container (1) using the system.

13 Claims, 4 Drawing Sheets

(51) Int. Cl.
*F01N 3/20* (2006.01)
*F01N 3/28* (2006.01)
*F01P 3/20* (2006.01)
*F02D 41/26* (2006.01)

(52) U.S. Cl.
CPC ............... *F01P 3/20* (2013.01); *F02D 41/26* (2013.01); *F01N 2610/02* (2013.01); *F01N 2610/105* (2013.01)

(58) Field of Classification Search
USPC .............. 701/101, 108, 114, 115; 123/41.01, 123/41.02, 41.04, 41.05; 60/286, 301, 60/302, 320, 295; 165/41, 42, 159, 160, 165/324.1, 324.6
See application file for complete search history.

(56) References Cited

U.S. PATENT DOCUMENTS

| | | |
|---|---|---|
| 8,511,077 B2 | 8/2013 | Schwarzkopf |
| 2005/0066671 A1* | 3/2005 | Srichai ............... B60H 1/00914 62/160 |
| 2010/0319651 A1 | 12/2010 | Kasahara |
| 2011/0301762 A1* | 12/2011 | Walker ................. F25D 29/003 700/275 |
| 2012/0206093 A1* | 8/2012 | Schaefer ............. B60L 11/1822 320/107 |
| 2014/0374058 A1* | 12/2014 | Greiner ............. B60H 1/00492 165/52 |

FOREIGN PATENT DOCUMENTS

| | | |
|---|---|---|
| DE | 199 35 920 | 3/2001 |
| DE | 19935920 A1 | 3/2001 |
| DE | 102004038081 | 3/2005 |
| DE | 102009009538 A1 | 8/2009 |
| DE | 102010029269 A1 | 12/2011 |
| DE | 102011015196 | 9/2012 |
| EP | 1662103 A1 | 5/2006 |

OTHER PUBLICATIONS

PCT Written Opinion dated Jul. 27, 2015, received in corresponding PCT Application No. PCT/EP15/59518, 5 pgs.
PCT International Preliminary Report on Patentability dated May 12, 2016, received in corresponding PCT Application No. PCT/EP15/59518, 6 pgs.
Office Action from related Chinese Application No. 201580028011.3 dated Jul. 12, 2017. English translation is attached.

\* cited by examiner

SYSTEM FOR HEATING A STORAGE CONTAINER FOR AN AQUEOUS OPERATING LIQUID IN A MOTOR VEHICLE AND METHOD FOR HEATING THE STORAGE CONTAINER

The invention relates to a system for heating a storage container for an aqueous operating liquid in a motor vehicle having a combustion engine cooled by means of a liquid heat transfer medium using the waste heat from the combustion engine, which is transferred to the heat transfer medium.

A system of this kind is known from DE 10 2009 009 538, for example. DE 10 2009 009 538 A1 describes a system for controlling the temperature of a liquid additive for an exhaust system of an internal combustion engine, which is distinguished by means for heat exchange between the additive and a refrigerant circuit of a refrigerant system, wherein the system comprises an intermediate circuit for indirect heat exchange with the heat transfer medium of the engine/coolant circuit. Thus, the system can be operated either in a cooling mode or in a heating mode. The embodiment in which the intermediate circuit is part of the coolant circuit of the engine, in particular, is supposed to have the advantage that not only the additive but also the engine coolant is heated, and this is supposed to result in more rapid heating of the engine when cold starting. However, these advantages are only obtained by interconnection with the refrigerant circuit of the air conditioning system (A/C circuit). Such interconnection is relatively complex.

In principle, it is possible to provide thawing heating systems for additive containers which are based on engine cooling water and make direct use of the waste heat from the combustion engine or engine for thawing, although these systems are subject to the disadvantage that heat is withdrawn from the engine cooling circuit particularly in the cold starting phase of the motor vehicle and this heat is not available for operating the motor vehicle and/or for operating the cabin heating system.

For this reason, electric thawing heating systems in operating liquid containers have become established, these having the advantage that it is possible to make available urea solution in the aqueous phase immediately when cold starting the motor vehicle at temperatures below the freezing point. Depending on the ambient temperature, however, there may be circumstances in which the electric thawing heating system is not capable of thawing the entire quantity of liquid within the storage container, with the result that cavitation occurs rapidly in the ice after removal of liquid from the storage container and hence, ultimately, heat transfer from the thawing heating system to the liquid is no longer assured. In some circumstances, such a system cannot provide liquid additive on a sustained basis at particularly low temperatures. In order to ensure this, a considerable melting capacity would have to be made available. At any event, an electric power of about 100 watts is not sufficient to achieve the desired sustainability in the case of an electrically operated thawing heating system.

The invention is therefore based on the object of providing a system based on engine heat for heating a storage container, by means of which it is possible to ensure inter alia that heating of the storage container is not at the expense of the engine operating temperature and especially not at the expense of comfort in the passenger cell.

The invention is furthermore based on the object of providing a relatively simple system for heating a storage container for an aqueous operating liquid in a motor vehicle.

The invention is also based on the object of providing a corresponding heating strategy for operating a system of this kind.

One aspect of the invention relates to a system for heating a storage container for an aqueous operating liquid in a motor vehicle having a combustion engine cooled by means of a liquid heat transfer medium, using the waste heat from the combustion engine, which is transferred to the heat transfer medium, said system comprising a first heat exchanger, which is provided in or on the storage container and can be heated by means of the heat transfer medium in a cooling circuit for the combustion engine, wherein the first heat exchanger is part of a storage container heating circuit, which comprises a heat transfer medium feed and a heat transfer medium return, wherein the storage container heating circuit is connected hydraulically in parallel or hydraulically in series with a second heat exchanger for heating the passenger cell of the motor vehicle, the storage container heating circuit comprises a valve with a controllable volume flow and further comprises means for measuring or calculating the volume flow of heat transfer medium in the storage container heating circuit and means for controlling the valve in accordance with a plurality of temperature signals from a plurality of temperature sensors, which are selected from a group comprising:

a temperature sensor in the heat transfer medium feed of the storage container heating circuit,
a temperature sensor in the heat transfer medium return of the storage container heating circuit,
a temperature sensor in the storage container,
a temperature sensor in the cooling circuit for the combustion engine,
a temperature sensor in the passenger cell, and
a temperature sensor in the second heating circuit.

By means of a temperature sensor in the heat transfer medium feed of the storage container circuit and a temperature sensor in the heat transfer medium return of the storage container circuit, it is a relatively simple matter to construct a controlled system for the heating power required, wherein control of the power can be accomplished by means of open-loop/closed-loop control of the volume flow of the heat transfer medium in the storage container heating circuit.

Heating power control can be accomplished using the following formula as a basis, for example:

$$B_{IST} = \text{mass flow} \times \text{specific heat capacity} \times \text{temperature difference}$$

Using the formula density=mass/volume, the following relationship is obtained:

$$B_{IST} = \text{constant} \times \text{volume flow} \times \text{temperature difference}$$

In this case, the constant is the product of density and specific heat capacity, while the density and heat capacity are each material constants of the cooling liquid used.

For the purpose of controlling the power, both measurement of the volume flow of the heat transfer medium in the storage container circuit and determination or calculation of the volume flow indirectly via the characteristic map of a delivery pump can be provided. This can be performed in such a way that, for example, the speed of the combustion engine is taken off via an interface of the engine electronics. The speed of the delivery pump is determined from the speed of the combustion engine. By way of the speed of the delivery pump, the pump pressure can be taken from the predetermined pump characteristic of the delivery pump. Using a transfer function of the valve, the volume flow of the transfer medium can then be m determined, taking into account the temperature-dependent viscosity of the heat transfer medium and the pressure loss coefficient of the volume flow of heat transfer medium.

For this purpose, the following equations can be used as indicated while, for the sake of simplicity, more or less temperature-independent material values are used as a starting point (e.g. water):

Specifications:
n=engine speed
i=engine/pump transmission ratio
m=pump speed=n×i
f(m)=Δp(m)=pump characteristic
Vx=volume flow in heating circuit 10
•$_0$=sum of the pressure loss coefficients in heating circuit 10=•$_1$+•$_2$
•$_1$=pressure loss coefficient for valve 13=transfer function of the valve position f(s)
•$_2$=pressure loss coefficient of fittings (heat exchanger, pipes etc.)=f(T)
ρ=density of the heat transfer medium
A=flow cross section $$\Delta p = \frac{\rho}{2} \times v^2 \times \zeta \qquad \text{Eq. 1}$$

from which it follows:

$$v = \sqrt{\frac{\Delta p \times 2}{\rho \times \zeta}} \qquad \text{Eq. 2}$$

with the continuity equation, the following then applies:

$$Vx = A \times \sqrt{\frac{\Delta p \times 2}{\rho \times \zeta}} \qquad \text{Eq.}$$

If A, ρ, ζ are combined in C, Eq. 3 can be simplified as follows:

$$Vx = C \times \sqrt{\Delta p} \qquad \text{Eq. 4}$$

With the corresponding temperature-dependent transfer functions of the delivery pump 5 of the valve, $\zeta_1$ and $\zeta_2$ and, taking into account the divider circuit between heating circuit 7b and heating circuit 10, C and Δp can be determined empirically, and, from these, Vx and hence ultimately also the current heating power can be calculated and controlled.

The storage container heating circuit is preferably connected hydraulically in parallel with the second heating circuit for heating the passenger cell. In this way, the heating power of the first heat exchanger can be adjusted relative to the heating power of the second heat exchanger in favor of or at the expense of the comfort of the passenger cell.

A liquid heat transfer medium in the sense according to the present invention should be taken to mean, for example, a commercially available liquid coolant for the combustion engine, which can be a water/glycol mixture, for example.

The heat transfer medium of the cooling circuit can preferably flow directly through the first heat exchanger but, as an alternative, the storage container heating circuit can also be designed as a closed intermediate circuit containing its own heat transfer medium. This is advantageous and expedient especially if the heating circuit for heating the passenger cell is also designed as a closed intermediate circuit.

The combustion engine in the system described here is preferably a diesel engine, and the aqueous operating liquid is preferably provided as an aqueous urea solution for selective catalytic exhaust gas reduction. A motor vehicle of this kind comprises a catalytic converter and a system for injecting the aqueous urea solution (AdBlue) into the exhaust section of the motor vehicle ahead of the catalytic converter.

In a preferred variant of the system according to the invention, an electronic heating power controller is provided, which activates the valve so as to perform control.

The heating power controller can be designed as a microcontroller or a microprocessor, for example.

In the electronic heating power controller, a heating strategy for the system can be stored in the form of a data processing program.

A preferred alternative variant of the system according to the invention is distinguished by a mechanical control unit, which controls the valve. Such a mechanical control unit has the advantage that it can be implemented in a relatively simple and low-cost manner.

The mechanical control unit can comprise at least one actuating member which responds to temperature, for example.

As a particularly preferred option, a wax motor is provided as an actuating member which responds to temperature.

A wax motor in the sense according to the present invention should be taken to mean an actuator which converts thermal energy into mechanical energy by using the phase transition of a wax. Using a wax which undergoes a relatively large change in density when it melts, typically between 5 to 20% by volume, the volume change work which arises in this case can act on a piston mechanism or a similar actuating member.

As an alternative to the use of one or more wax motors, it is also possible to provide bimetallic elements as actuating members which respond to temperature, for example. Bimetallic elements are subject to a change in shape due to different coefficients of thermal expansion of different metals used. This change in shape can likewise be exploited to implement a mechanical actuating member.

The use of wax motors has the advantage that they can be coupled in a particularly simple manner to temperature sensors, e.g. by a capillary connecting line.

In a preferred variant of the system according to the invention, it is therefore envisaged that the wax motor is coupled thermally to a temperature sensor by a capillary connecting line, the temperature sensor, in turn, being exposed to the heat transfer medium or, for example, to the ambient air in the passenger cell.

In an advantageous variant of the system according to the invention, it is envisaged that the control unit comprises means for mechanical differential pressure measurement as means for measuring the volume flow of heat transfer medium. In this way, it is possible to construct a simple controlled system by means of two temperature signals and detection of the volume flow of the heat transfer medium in the storage container heating circuit.

Two wax motors are preferably provided, of which a first wax motor is coupled thermally to a first temperature sensor by a first capillary connecting line and a second wax motor is coupled thermally to a second temperature sensor by a second capillary connecting line, wherein the first temperature sensor is arranged in the storage container and the second temperature sensor is arranged in the second heating circuit.

In advantageous variant of the system according to the invention, it is envisaged that the storage container comprises an additional electric thawing heating system, which is operated during the cold starting phase of the motor vehicle, preferably at ambient temperatures below the freezing point of water at which the operating liquid is frozen.

Another aspect of the invention relates to a method for heating a storage container for an aqueous operating liquid in a motor vehicle, preferably using a system of the type described above, comprising control of the volume flow in the storage container heating circuit in accordance with the temperature of the operating liquid in the storage container and in accordance with the temperature of the heat transfer medium in the cooling circuit for the combustion engine, wherein the valve in the storage container heating circuit is set to an open position if the temperature of the operating liquid falls below a predetermined minimum temperature and if the temperature of the heat transfer medium in the cooling circuit for the combustion engine exceeds a predetermined minimum temperature.

Operation of the storage container heating system or operation of the storage container heating circuit can be provided, for example, if the temperature of the operating liquid is <5° C. and the engine cooling water temperature or temperature of the heat transfer medium in the cooling circuit for the combustion engine is <20° C.

In the method according to the invention, it can furthermore be envisaged that the volume flow in the storage container heating circuit is additionally controlled in accordance with the temperature of the heat transfer medium in the second heating circuit or in accordance with the temperature in the passenger cell, wherein the valve is set to a reduced opening position if the temperature of the heat transfer medium in the second heating circuit or the temperature in the passenger cell falls below a predetermined comfort temperature.

A temperature of 0.22° C. in the passenger cell can be envisaged as a comfort temperature, for example.

For example, it is possible to envisage limiting the heating power to about 500 watts as long as the temperature in the passenger cell is <22° C. When this comfort temperature is exceeded, the maximum heating power can be enabled, and this can be of the order of 800 to 1000 watts, for example.

In another variant of the method according to the invention, it is envisaged that the valve is set to a reduced opening position or to a closed opening position if the temperature of the heat transfer medium in the storage container heating circuit or the temperature of the operating liquid reaches or exceeds a predetermined maximum temperature. This maximum temperature can be 60° C., for example.

On the one hand, this prevents decomposition of the additive or of the operating liquid, where applicable, and, on the other hand, it may be worthwhile to specify a maximum temperature to prevent the operating fluid from being heated continuously.

In another worthwhile and expedient variant of the invention, it is envisaged that additional operation of the thawing heating system takes place during a cold starting phase of the motor vehicle, in particular at ambient temperatures below the freezing point of water.

The invention is explained below with reference to the drawings by means of two illustrative embodiments.

Figure 2:
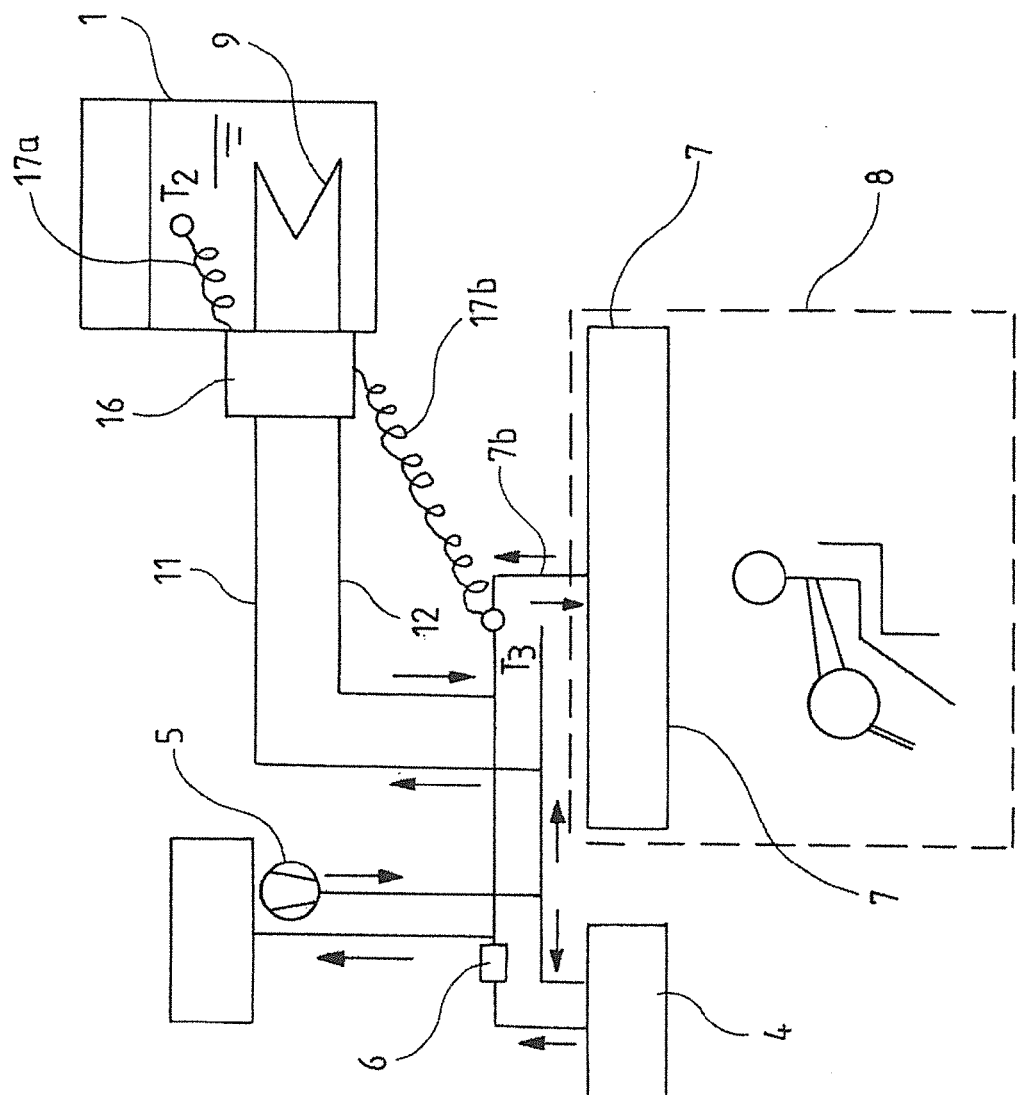
Figure 3:
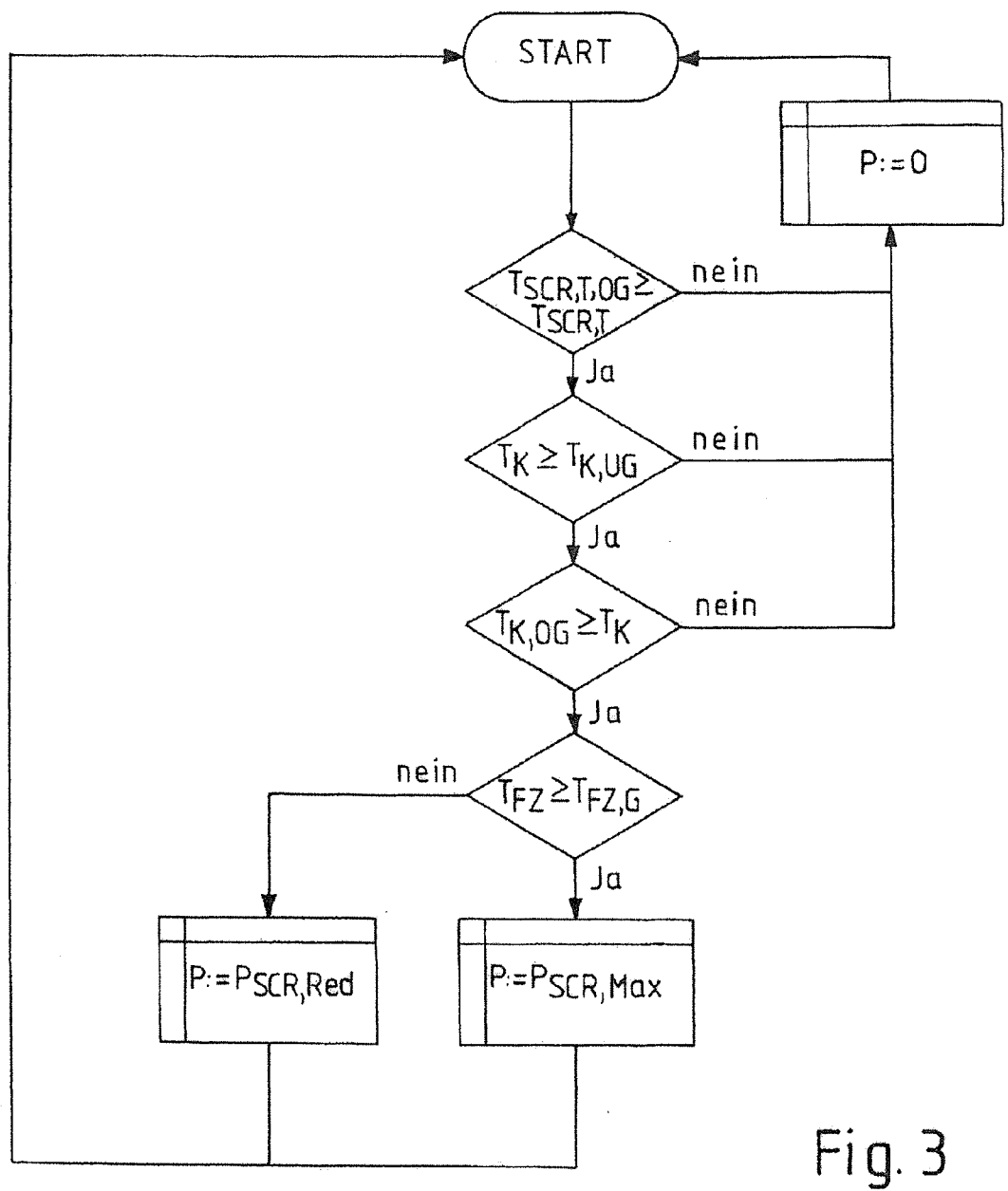
Figure 4:
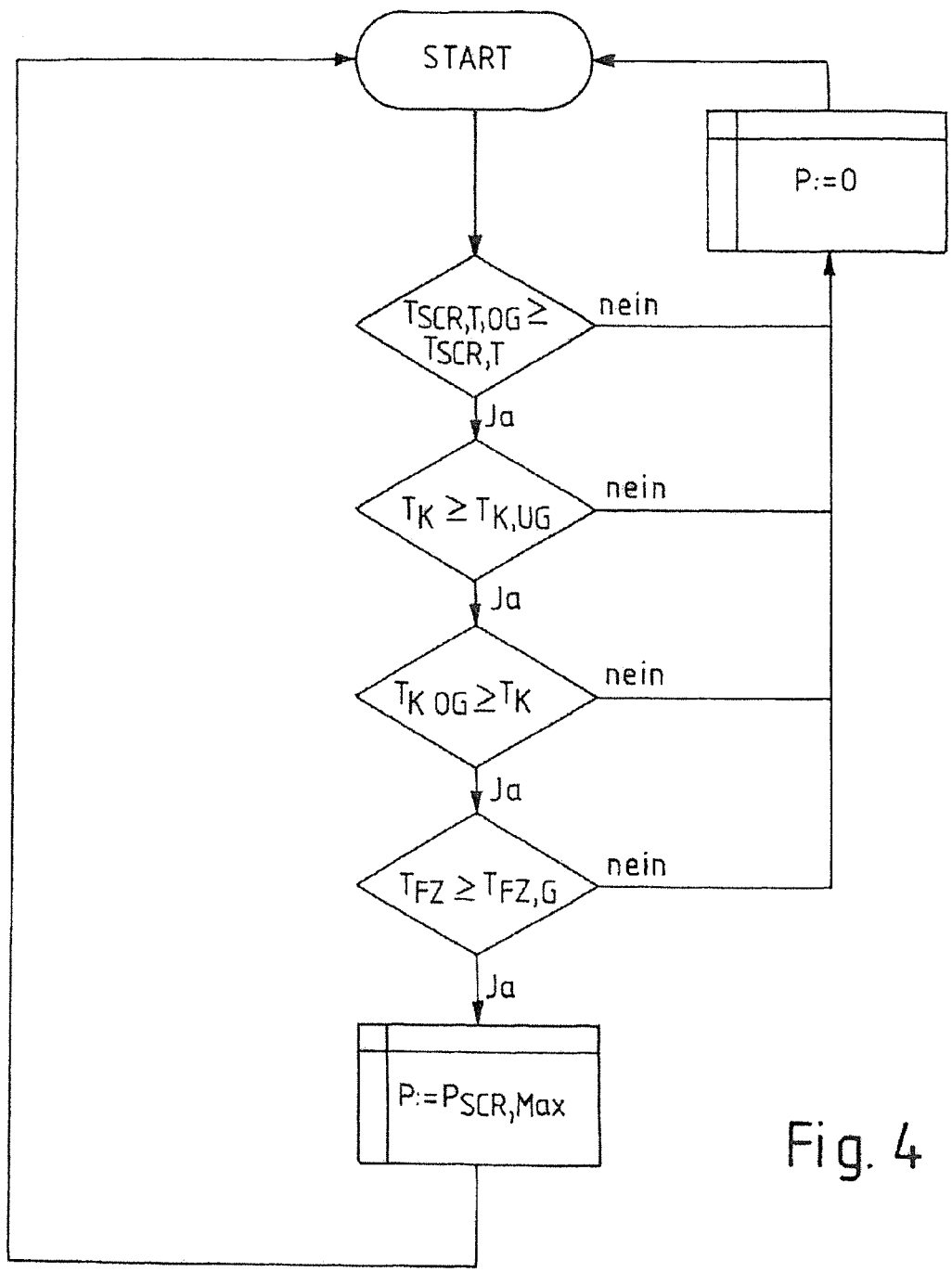

In the drawings:

FIG. 1: shows a schematic representation of a system according to the invention in accordance with a first illustrative embodiment, using an electronic heating power controller, FIG. 2: shows a schematic representation of the system in accordance with a second illustrative embodiment of the invention, using a mechanical heating power controller, FIG. 3: shows the representation of a control structure with reduced and maximum heating power, and FIG. 4: shows the representation of a control structure with maximum heating power.

Reference is made first of all to FIG. 1, which shows a system according to the invention, by means of which both the control structure shown in FIG. 2 and the control structure shown in FIG. 3 can be implemented.

With the system according to FIG. 2, both control structures shown in FIGS. 3 and 4 can likewise be implemented.

A system for heating a storage container 1 for an aqueous operating liquid, e.g. an aqueous urea solution in a diesel motor vehicle is shown schematically in FIG. 1. The storage container 1 is shown on a disproportionately large scale in comparison with the other components of the system or of the motor vehicle.

2 denotes the combustion engine of the motor vehicle, which comprises a conventional cooling circuit 3 and an engine radiator 4. There is a flow of a liquid heat transfer medium in the form of a water/glycol mixture through the cooling circuit 3.

The heat transfer medium is circulated in the cooling circuit 3 by means of a water pump 5 (delivery pump). The cooling circuit 3 comprises an engine thermostat 6 (thermostatic valve). A second heat exchanger 7 for heating a passenger cell 8 of the motor vehicle is integrated into the cooling circuit 3 in parallel with the engine radiator. The second heat exchanger 7 is part of a second heating circuit 7b. The second heat exchanger 7 is connected hydraulically in parallel with the engine radiator 4. Moreover, the second heat exchanger 7 is connected hydraulically in parallel with a first heat exchanger 9, which is coupled thermally to the storage container 14 and to the operating liquid in the storage container 1. The first heat exchanger 9 can be arranged in a double bottom of the storage container 1, for example, or can be laid as a heating coil within the free volume of the storage container 1.

The first heat exchanger 9 is part of a storage container heating circuit 10, which comprises a heat transfer medium feed 11 and a heat transfer medium return 12.

A valve 13 with a controllable volume flow and a volume flow measuring device 14 are provided in the heat transfer medium feed 11 of the storage container heating circuit 10.

The system furthermore comprises a temperature sensor T1 in the cooling circuit 3 downstream of the water pump 5, a temperature sensor T2 within the storage container 1, which is immersed in the operating liquid, a temperature sensor T3 in the passenger cell, a temperature sensor T4 in the heat transfer medium feed 11 of the storage container heating circuit 10 and a temperature sensor T5 in the heat transfer medium return 12 of the storage container heating circuit 10.

The signals from the temperature sensors T1 to T5 are detected by a microcontroller 15 and are applied there to respective signal inputs. A further signal input of the microcontroller 15 receives a volume flow measurement signal from the volume flow measuring device 14.

When the combustion engine 2 is cold-started, the engine thermostat 6 (the terms engine and combustion engine are used synonymously in this document) is initially closed, ensuring that the heat transfer medium in the cooling circuit 3 does not flow through the engine radiator 4. The engine thermostat 6 is arranged downstream of the engine radiator 4 and the cooling circuit 3.

If the engine thermostat 6 interrupts the cooling circuit 3 at this point, the heat transfer medium 3 can flow through both the second heat exchanger 7 and, in certain circumstances, the first heat exchanger 9. The volume flow of heat transfer medium within the storage container heating circuit 10 is controlled by means of the valve 13, more specifically in accordance with the control structures shown in FIGS. 3 and 4.

In the control structure according to FIG. 3, the abbreviations used have the following meanings:

$T_{SCR}$, T=temperature of the operating liquid (ACTUAL value),
$T_{SCR}T$, OG=temperature of the operating liquid, upper limit (predetermined value),
$T_K$=temperature of the heat transfer medium in the cooling circuit,
$T_K$, UG=lower limit of the temperature of the heat transfer medium in the cooling circuit (predetermined value),
$T_K$, OG=upper limit of the temperature of the heat transfer medium in the cooling circuit (predetermined value),
$T_{F2}$=temperature in the passenger cell (ACTUAL value)
$T_{F2}$, G=limiting temperature in the passenger cell (predetermined value)
$P_{SCR}$, max=maximum heating power (predetermined value),
$P_{SCR}$, red=reduced heating power (predetermined value)

The abbreviation SCR stands for selective catalytic reduction and relates to a urea solution as an aqueous operating liquid.

$T_{SCR}$, T is determined by means of temperature sensor T2, T, is determined by means of sensor T1, and $T_{F2}$ is determined by means of temperature sensor T3.

If the temperature of the operating liquid ($T_{SCR}$, T<5° C. and the temperature of the heat transfer medium $T_K$ (temperature sensor T1) >20° C., the valve 13 is moved into an open position. If the temperature in the passenger cell $T_{F2}$ (temperature sensor T3) <22° C., the heating power is limited to 500 watts, i.e. the valve 13 is moved into a reduced open position (P=$P_{SCR}$, red).

If the temperature of the heat transfer medium exceeds an upper limit, e.g. 60° C. ($T_K$, OG), the valve 13 is moved into a closed position.

The control structure shown in FIG. 4 is simplified relative to the control structure shown in FIG. 3 to the extent that, in that case, the valve 13 is moved into the fully open position when a predetermined minimum temperature of the cooling circuit 3 of the combustion engine is exceeded.

The control structures shown in FIGS. 3 and 4 are stored in the microcontroller 15 as the electronic heating power controller in the system shown in FIG. 1.

The controlled system for the heating power is implemented by means of the temperature sensors T4 and T5 and the volume flow measuring device 14.

In the system shown in FIG. 2, identical components are provided with the same reference signs.

In the illustrative embodiment shown in FIG. 2, the electronic heating power controller is replaced by a mechanical heating power controller 16. In other respects, the hydraulic circuitry corresponds to that in the system shown in FIG. 1.

A valve (not shown) and two wax motors are integrated into the mechanical heating power controller 16. The valve can comprise an orifice plate or a baffle, for example, as a means for measuring the volume flow of heat transfer medium. The mechanical heating power controller 16 does not necessarily have to comprise means for measuring the volume flow of heat transfer medium; on the contrary, the volume flow of the heat transfer medium can also be determined by means of the characteristic map of the water pump 5 as a delivery pump for the heat transfer medium. Moreover, an integrated valve can be provided, on which the wax motors act as actuators.

The wax motors are each coupled to the storage container 1 and to the second heating circuit 7b by capillary connecting lines 17a and 17b. A first capillary connecting line 17a is coupled thermally to a first temperature sensor T2 in the storage container 1 by a first wax motor, whereas a second wax motor is coupled to the second temperature sensor T3 in the second heating circuit 7b by a second capillary connecting line 17b. The first temperature sensor T2 can bring about closure of the valve 13 integrated into the mechanical heating power controller 16 when there is an appropriate heating of the operating liquid, for example, whereas the second temperature sensor can bring about opening of the relevant valve 13 when there is heating of the heat transfer medium in the second heating n circuit 7b.

LIST OF REFERENCE SIGNS 1 storage container
2 combustion engine
3 cooling circuit
4 engine radiator
5 water pump
6 engine thermostat
7 second heat exchanger
7b second heating circuit
8 passenger cell
9 first heat exchanger
10 storage container circuit
11 heat transfer medium feed
12 heat transfer medium return
13 valve
14 volume flow measuring device
T1 to T5 temperature sensors
15 microcontroller
16 mechanical heating power controller
17a first capillary connecting line
17b second capillary connecting line

What is claimed is:

1. A system for heating a storage container for an aqueous operating liquid in a motor vehicle having a combustion engine cooled by a liquid heat transfer medium, using the waste heat from the combustion engine, which is transferred to the heat transfer medium, said system comprising:
a first heat exchanger, which is provided with the storage container and is heatable by the heat transfer medium in a cooling circuit for the combustion engine,
wherein the first heat exchanger is part of a storage container heating circuit, which comprises a heat transfer medium feed and a heat transfer medium return,
wherein the storage container heating circuit is connected hydraulically with a second heating circuit for heating the passenger cell of the motor vehicle,
wherein the storage container heating circuit comprises a valve with a controllable volume flow and further comprises means for at least one of measuring and calculating the volume flow of heat transfer medium in the storage container heating circuit and means for controlling the valve in accordance with a plurality of temperature signals from a plurality of temperature sensors, which are selected from a group comprising,
a temperature sensor T4 in the heat transfer medium feed of the storage container heating circuit;
a temperature sensor T5 in the heat transfer medium return of the storage container heating circuit;
a temperature sensor T2 in the storage container;
a temperature sensor T1 in the cooling circuit for the combustion engine;
a temperature sensor T3 in the passenger cell; and
a temperature sensor T3 in the second heating circuit.

2. The system as claimed in claim 1, comprising:
an electronic heating power controller, which activates the valve so as to perform control.

3. The system as claimed in claim 2, wherein:
the heating power controller comprises at least one of a microcontroller and a microprocessor.

4. The system as claimed in claim 1, comprising:
a mechanical control unit which includes the valve.

5. The system as claimed in claim 4, wherein:
the mechanical control unit comprises at least one actuating member which responds to temperature.

6. The system as claimed in claim 4, wherein:
a wax motor is provided as an actuating member which responds to temperature.

7. The system as claimed in claim 6, wherein:
the wax motor is coupled thermally to a temperature sensor T1 to T5 by a capillary connecting line.

8. The system as claimed in claim 4, wherein:
the mechanical control unit comprises means for mechanical differential pressure measurement as means for measuring the volume flow of heat transfer medium.

9. The system as claimed in claim 6, comprising:
two wax motors, of which a first wax motor is coupled thermally to a first temperature sensor by a first capillary connecting line and a second wax motor is coupled thermally to a second temperature sensor by a second capillary connecting line, wherein the first temperature sensor T2 is arranged in the storage container and the second temperature sensor is arranged in the second heating circuit.

10. The system as claimed in claim 1, comprising:
an additional electric thawing heating system having at least one electric resistance heating element, said heater being operated during the cold starting phase of the motor vehicle.

11. A method for heating a storage container for an aqueous operating liquid in a motor vehicle, using a system as claimed in claim 1, comprising control of the volume flow in the storage container heating circuit in accordance with the temperature of the operating liquid in the storage container and in accordance with the temperature of the heat transfer medium in the cooling circuit for the combustion engine, wherein the valve in the storage container heating circuit is set to an open position if the temperature of the operating liquid falls below a predetermined minimum temperature and if the temperature of the heat transfer medium in the cooling circuit for the combustion engine exceeds a predetermined minimum temperature wherein the volume flow in the storage container heating circuit is additionally controlled in accordance with at least one of the temperature of the heat transfer medium in the second heating circuit and the temperature in the passenger cell, wherein the valve is set to a reduced opening position if the temperature of the heat transfer medium in at least one of the second heating circuit and the temperature in the passenger cell falls below a predetermined comfort temperature.

12. The method as claimed in claim 11, wherein:
the valve is set to at least one of a reduced opening position and a closed opening position if at least one of the temperature of the heat transfer medium in the storage container heating circuit and the temperature of the operating liquid is at least equal to a predetermined maximum temperature.

13. The method as claimed in claim 11, wherein:
additional operation of an electric thawing heating system takes place during a cold starting phase of the motor vehicle.

* * * * *